United States Patent [19]
Peura

[11] 3,785,217
[45] Jan. 15, 1974

[54] ROLLER ASSEMBLY AND METHOD OF MAKING THE SAME
[75] Inventor: Warren A. Peura, Madison, Wis.
[73] Assignee: Consolidated Foods Corporation, Chicago, Ill.
[22] Filed: July 17, 1972
[21] Appl. No.: 272,553

[52] U.S. Cl............................... 74/230.3, 264/242
[51] Int. Cl...................... F16h 55/36, B32b 23/00
[58] Field of Search...................... 74/230.3, 230.4; 264/242

[56] References Cited
UNITED STATES PATENTS
| | | | |
|---|---|---|---|
| 3,589,149 | 6/1971 | Fischer | 74/230.4 |
| 3,591,669 | 7/1971 | Memory | 264/242 |
| 3,627,868 | 12/1971 | Funahashi | 264/242 |

*Primary Examiner*—Leonard H. Gerin
*Attorney*—Vernon J. Pillote

[57] ABSTRACT

A roller assembly having an inner stator member and an outer roller member rotatably supported on the stator member and method of making the same in which the roller member is molded in an annular form with an inner bearing surface of circular cross-section extending axially through the roller member, and the inner stator member is thereafter injection molded inside the inner bearing surface, of a plastic material having a molding shrinkage characteristic such as to provide sufficient clearance between the stator and roller members for a running fit therebetween. In molding the stator member in the roller member, circumferentially spaced portions of the inner bearing surface of the roller member are preferably sealed from the mold cavity for the stator member so that the stator member is formed with a non-circular cross-section with only circumferentially spaced portions having a shape conforming to and in a running fit with the inner bearing surface on the roller member.

16 Claims, 11 Drawing Figures

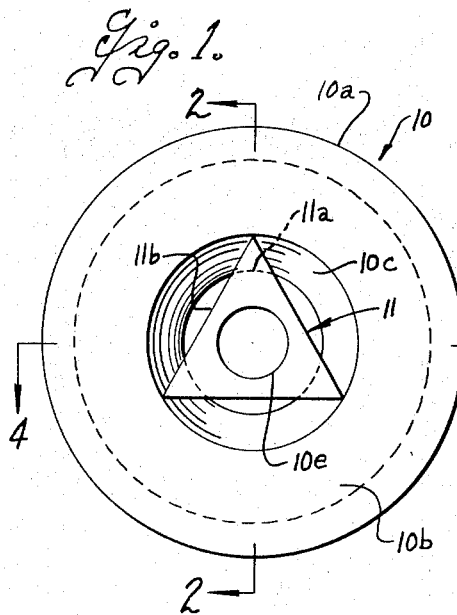
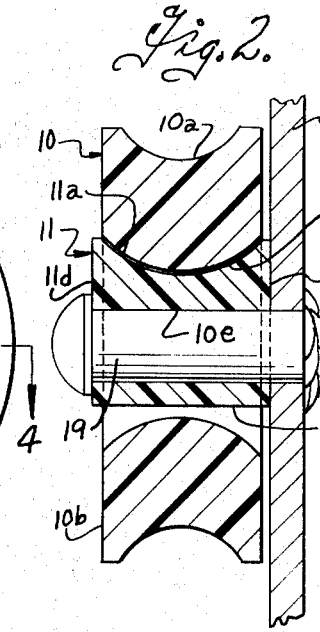
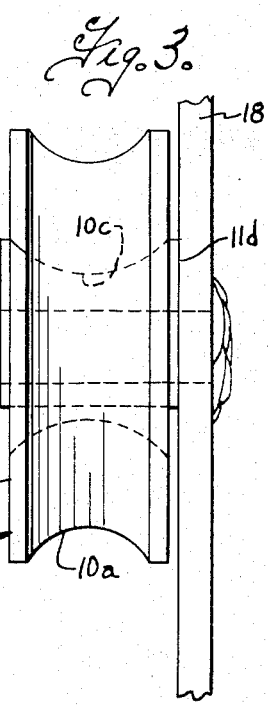
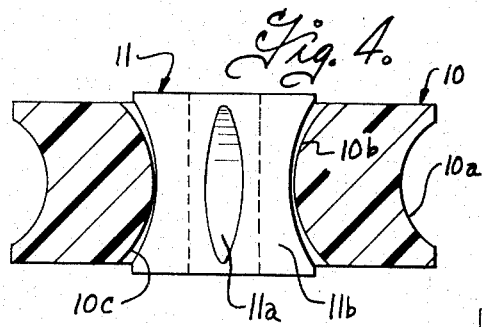
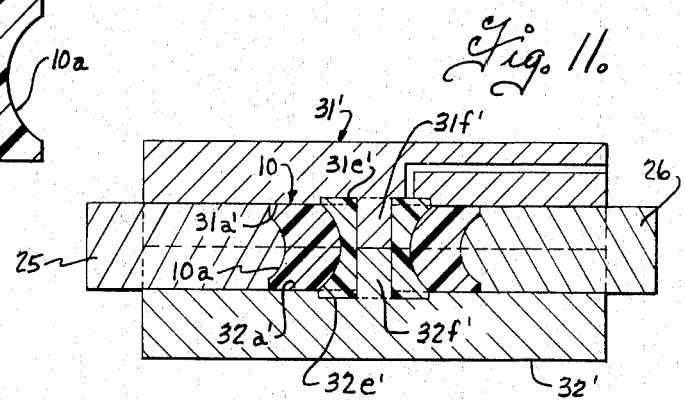
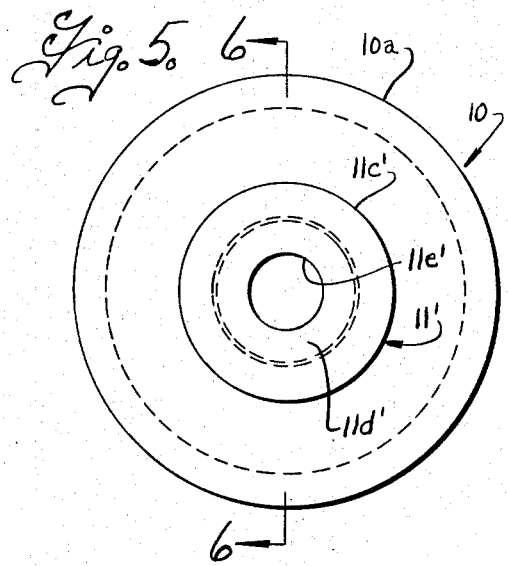
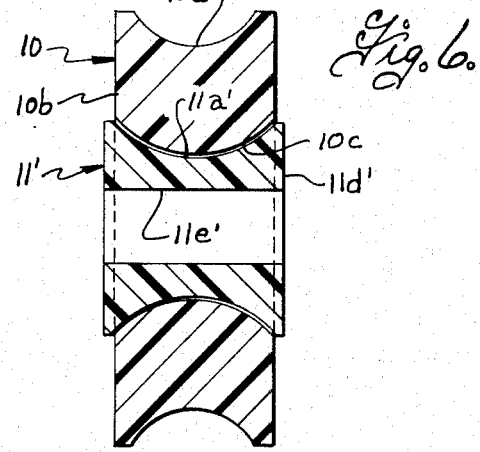

ROLLER ASSEMBLY AND METHOD OF MAKING THE SAME

BACKGROUND OF THE INVENTION

Various different arrangements have heretofore been proposed for making roller assemblies for use as wheels, bearings, pulleys and the like. It is common practice to separately mold the roller member and the axle and to thereafter assemble the roller and axle and secure a stop means on the axle to prevent the roller from moving axially off the axle. However, the separate molding and handling of the several parts and the subsequent assembly step increases the overall cost of such roller assemblies. It has also been proposed, as disclosed in the U.S. Pat. to Smith, No. 2,724,867 to mold the rim and axle simultaneously of the same material, with a flange on one end of the axle connected by a thin frangible web to one end of the roller in alignment with the axle opening therein, so that the roller could thereafter be assembled on the axle by rupturing the frangible web and shifting the roller axially over the flange onto the axle. This roller construction and procedure, however, necessitates forming the roller and axle from the same material and also limits the size of the flange for retaining the roller on the axle to one having an interference fit with the axle opening in the roller. It has also been proposed, as disclosed in the U. S. Pat. to Ferdig, No. 3,206,992 to simultaneously mold the outer roller and axle of the same material with the axle inside the outer roller but separated therefrom by a thin mold sleeve to provide a running clearance between the roller and axle. That construction and procedure, however, necessitated a relatively complex mold apparatus and, moreover, the flange for retaining the roller on the axle had to be made sufficiently small and thin so as to be deflectable during withdrawal of the mold sleeve from between the roller and axle.

SUMMARY OF THE INVENTION

The present invention relates to a roller assembly having an inner stator member and an outer roller member rotatably supported on the stator and method of making the same in which the roller member is molded in an annular form with an inner bearing surface of circular cross-section extending axially through the roller member, and the stator member is thereafter injection molded inside the inner bearing surface of the roller member of a plastic material having molding shrinkage characteristics such as to provide sufficient clearance between the roller and stator members for a running fit therebetween. In molding the stator member inside the roller member, circumferentially spaced portions of the inner bearing surface on the roller member are preferably sealed from the mold cavity for the stator member so that the stator member has a non-circular configuration with only circumferentially spaced portions shaped in conformity with the inner bearing surface on the roller member. The roller and stator members are advantageously molded of different plastic materials, with the plastic material for the outer roller member being selected to provide the desired rigidity and surface characteristics for its use as a wheel, bearing or pulley, and the plastic material for the inner stator member being selected to provide low friction characteristics. The successive moldings of the roller member and the stator member in the roller member are preferably effected in rapid succession with the stator member being injection molded to the roller member after the roller member has solidified but before it has cooled to ambient temperature, and the plastic materials for the stator and roller members are selected such that the stator member has a lower melting point and a higher molding shrinkage characteristic than the roller member and such as to provide the desired running fit therebetween when the parts have cooled. Since the stator member is molded inside the annular bearing surface on the roller member, the annular bearing surface on the roller member can be formed with a non-linear configuration such that the inner bearing surface and the conforming portions on the stator member prevent axial movement while permitting free rotational movement of the roller member relative to the stator member.

These and other aspects of the invention will be more fully understood from the following detailed description and the accompanying drawings in which:

FIG. 1 is a side view of a preferred embodiment of a roller assembly;

FIG. 2 is a sectional view through the roller assembly taken on a plane 2—2 of FIG. 1;

FIG. 3 is a edge elevational view of the roller assembly shown mounted on a support;

FIG. 4 is a sectional view taken on the broken line section 4—4 of FIG. 1;

FIG. 5 is a side view of a modified form of roller assembly;

FIG. 6 is a sectional view taken on a plane 6—6 of FIG. 5;

FIG. 11 is a sectional view through a modified form of mold assembly for forming the stator member of the roller assembly of FIGS. 5 and 6.

Figure 7:
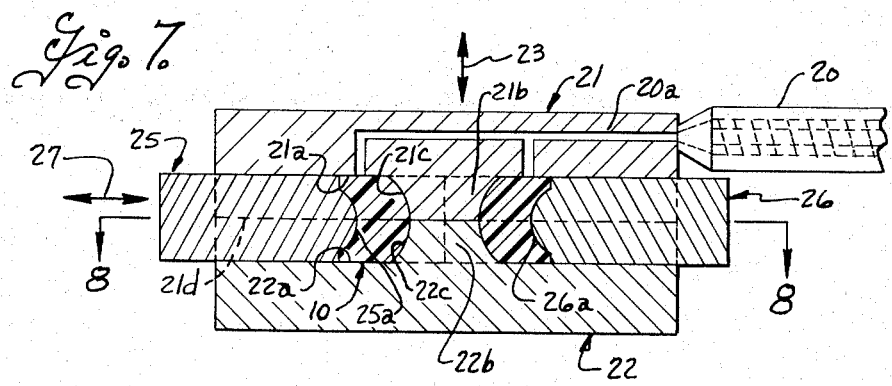
FIG. 7 is a sectional view through a mold assembly illustrating the formation of the outer roller member.

The roller assembly in general includes an outer roller member 10 of annular configuration, and an inner stator member 11 injection molded in the roller member and having a mold shrink clearance therewith to provide a running fit between the roller and stator members. The roller member is initially formed to have an inner bearing surface of circular cross-section, and the stator member is thereafter injection molded into the roller member so that the stator member has at least circumferentially spaced portions conforming to the shape of the bearing surface. The stator member is injection molded of a plastic material having molding shrinkage characteristics to provide sufficient clearance between the roller and the stator to provide a running fit therebetween. Preferably, the outer roller member and the inner stator member are formed as successive stages of a two-step injection molding process and, in order to minimize the overall cycle time to complete the two-step molding process, the plastic materials for the inner and outer members are selected so that the plastic material used in the inner stator member has a relatively higher molding shrinkage characteristic and a relatively lower melting temperature than the material used for the outer roller member.

The outer roller member 10 is formed in annular shape having an outer rim surface 10a, opposed end faces 10b, and an inner bearing surface 10c of circular cross-section. In order to inhibit relative axial movement between the roller and stator after the roller assembly is completed, the inner bearing surface 10c is formed with a longitudinally varying diameter, the diameter being a minimum intermediate the ends of the roller and being relatively larger adjacent opposite end walls 10b. Preferably, the inner bearing surface is longitudinally convex as best shown in FIGS. 2, 4 and 6, with a radius of curvature that is larger than the axial length of the roller. The circular rim surface 10a on the roller can be formed with different longitudinal configurations. In the embodiment illustrated, the roller assembly is adapted for use as a pulley and is formed with a peripheral groove. As will be readily apparent, the outer rim surface 10a can be made flat, flanged or convex, if desired for use as a wheel or bearing.

In the preferred embodiment shown in FIGS. 1–4, the stator member is injection molded in the outer roller member to have a non-circular and preferably generally triangular configuration, with circumferentially spaced portions 11a shaped in conformity with the inner bearing surface on the roller member, and with intermediate portions 11b spaced radially inwardly from the inner bearing surface. In the form shown, the intermediate portions 11b of the stator member are generally planar and extend in chordal fashion to the major outer diameter of the inner bearing surface 10c on the roller member. Since the inner bearing surface 10c is longitudinally convex, the circumferentially spaced portions 11a on the stator member which engage the inner bearing surface on the roller member, have a maximum circumferential width adjacent the minor diameter of the inner bearing surface and decrease in width towards the ends of the roller so as to have a generally elliptical shape, as shown in FIG. 4. The shape of the inner stator member can of course be modified to increase the width of the surfaces 11a that contact the inner bearing surface 10 c. The roller illustrated in FIGS. 1–4 is adapted for mounting on a flat support surface and at least one of the end faces 11d of the stator member is preferably offset outwardly from the plane of the corresponding end face 10b on the roller, to provide a working clearance between the roller and the support 18. A fastener receiving opening 10e is formed in the stator member for receiving a fastener 19 for mounting the roller assembly on the support 18.

The outer roller member 10 in the embodiment of the roller shown in FIGS. 5 and 6 is the same as that illustrated and described in connection with FIGS. 1–4 and like numerals are used to designate the corresponding parts. In the embodiment of FIGS. 5 and 6, however, a modified inner stator member 11' is injection molded in the outer roller member. Stator member 11' is injection molded so that its outer periphery 11a' is of circular cross-section and is shaped in conformity with, and has a shrink clearance relative to, the inner bearing surface 10c on the outer roller member. As in the preceding embodiment, at least one of the end faces 11d' the inner stator member is preferably offset outwardly from the corresponding end face of the roller member to provide a running clearance for the roller member when the latter is mounted on a flat support surface, and an opening 10e' is provided in the stator member 11' for receiving a fastener for mounting the same.

Figure 8:
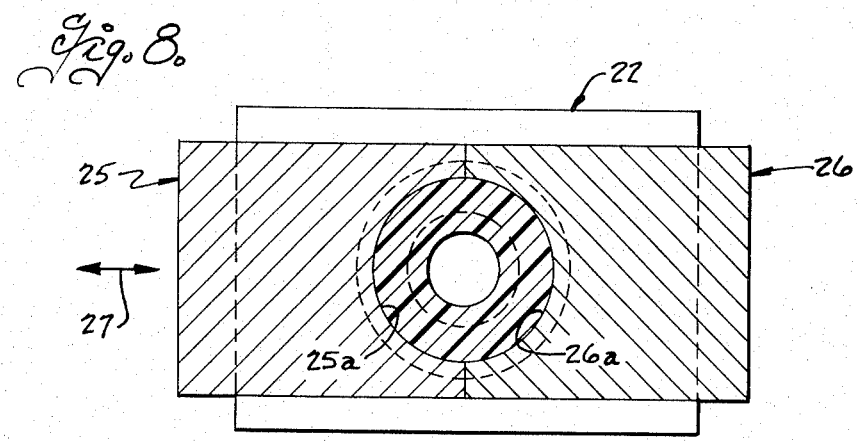
FIG. 8 is a sectional view through the mold assembly taken on the plane 8—8 of FIG. 7.

While the outer roller member can be formed in various different ways and of different materials, it is preferably formed by injection molding a plastic material as a first step in a two-step injection molding process for forming the roller assembly. The mold assembly utilized for forming the outer roller member will vary somewhat, dependent largely on the configuration of the outer rim surface 10a to be formed. In the mold assembly illustrated in FIGS. 7 and 8, a pair of mold members 21 and 22 are supported for relative movement in a direction indicated by the arrow 23 and have side faces 21a, 22a, shaped to form the opposed end faces 10b on the roller member, and generally frustoconical bosses 21b, 22b having peripheral surfaces 21c and 22c respectively of circular cross-section and longitudinally varying diameter to form the inner bearing surface 10c of the roller member. Preferably, the parting line 21d of the mold members is located immediately between the ends of the roller member. In order to form the concave periphery on the outer rim surface 10a of the roller member, a pair of mold members 25, 26 are mounted for relative movement in the direction indicated by the arrow 27, and the mold members 25, 26 have opposed semi-circular recesses 25a, 26a with a transverse configuration such as to form the concave periphery on the roller member. As will be understood, the transversely movable mold members 25, 26 would not be required if the periphery of the roller were flat or convex, for use as wheel or bearing. In such wheel or bearing assemblies, the outer periphery rim surface 10a can be formed by annular walls on the mold members 21 and 22. As diagrammatically illustrated in FIG. 7, the plastic material for forming the outer roller member is fed from an injection molding apparatus 20 through sprue gates 20a to the mold cavity.

Figure 9:
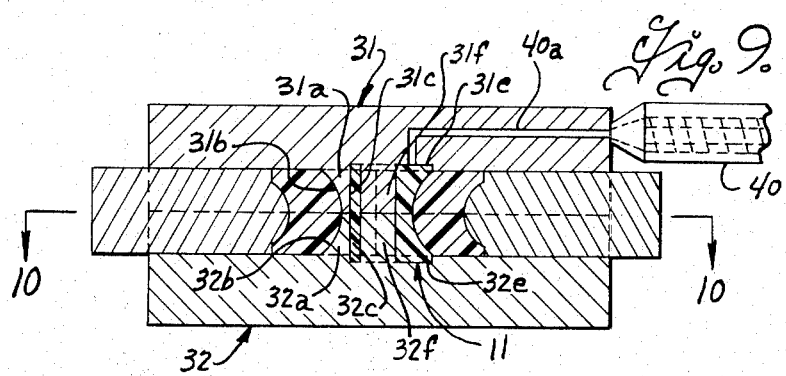
FIG. 9 is a sectional view through the mold assembly for molding the inner stator member of the wheel assembly of FIGS. 1-4.
Figure 10:
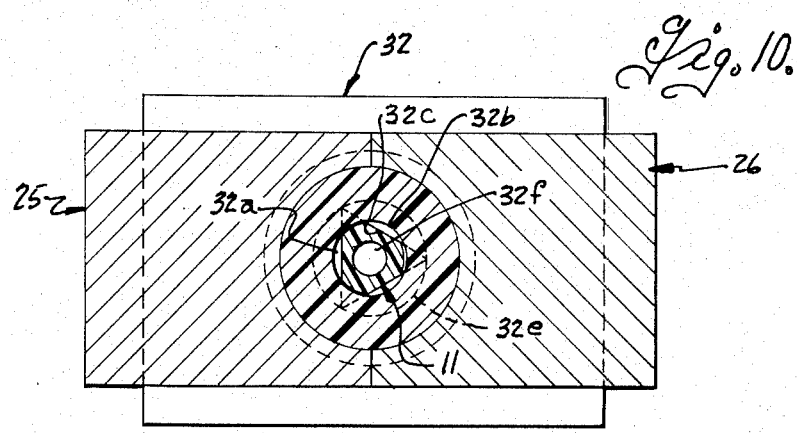
FIG. 10 is a sectional view through the mold assembly taken on the plane 10—10 of FIG. 9.

The inner stator member 11 is injection molded of a plastic material inside the outer roller member so as to have portions conforming to the inner bearing surface of the roller member and to have a shrink clearance therewith. Molding of the inner stator member is effected by sealingly engaging the end faces 10b of the outer roller member between a pair of mold members 31, 32, (FIGS. 9 and 10) to form a mold cavity inside the outer roller member. The mold members 31 and 32 are also formed with a plurality of circularly spaced projections 31a, 32a, each having arcuate outer surfaces 31b, 32b, shaped to conform with circumferentially spaced portions of the inner bearing surface 10c on the outer roller member, and inner surfaces 31c, 32c shaped to form the intermediate portions on the inner stator member. The projections 31a, 32a are attached to or formed integral with the respective mold members 31 and 32 and located thereon so as to sealingly engage circumferentially spaced portions of the inner bearing surface on the outer roller member to thereby define a non-circular mold cavity in the inner bearing member in which those portions of the inner bearing surface, intermediate the circumferentially spaced portions engaged by the projections 31a and 32a, form walls of the mold cavity. The mold members 31 and 32 are also recessed slightly as indicated at 31e, 32e to form the end faces 11d on the inner stator member which are offset outwardly from the corresponding end faces on the inner roller member, and axial projections 31f, 32f are provided on the mold members to form the fastener receiving opening 10e in the stator member. The plastic material is then injected into the mold and allowed to cool sufficient to at least solidify before removing the mold members and the completed roller assembly from the mold. Because of the high molding pressures utilized in injection moldings, it is desirable to radially support or confine the outer roller member during the injection molding operation and, as diagrammatically shown in FIGS. 9 and 10, the mold members 25, 26, previously utilized in shaping the outer rim surface of the roller member, are conveniently utilized for this purpose. As diagrammatically shown in FIG. 9, plastic material for the inner stator member is fed from an injection molding apparatus 40 through sprue gates 40a to the mold cavity.

Molding of the inner stator member in the roller assembly in FIGS. 5 and 6 is effected in a manner similar to that previously described, but without engaging the mold members against the inner bearing surface. Thus, as shown in FIG. 11, mold members 31', 32' are provided with side faces 31a', 32a' arranged to engage opposite sides of the outer roller member, and recessed faces 31e', 32e' arranged to form the end faces on the inner stator member. Plug members 31f', 32f' are provided on the mold members 31, 32 to form the fastener receiving passage in the inner stator member. In molding this form of roller assembly, the plastic material is injection molded into the cavity inside the outer roller member so as to have an annular outer configuration conforming with the inner bearing surface 10c on the outer roller member, with a shrink clearance therewith after the plastic cools. As previously discussed, the outer roller member is preferably radially supported during molding of the inner stator member and this can conveniently be effected by the mold members 25, 26. Satisfactory roller operation necessitates a very free running fit between the outer roller member and the inner stator member. The materials utilized in molding the outer roller member and inner stator member are selected to provide the necessary shrinkage for a free running fit and, in addition, the materials are selected so as to avoid damage to the inner bearing surface 10c on the outer roller member during injection molding of the inner stator member therein. Advantageously, the inner stator member is formed of a plastic material having high lubricity, that is a relatively low coefficient to friction, and the outer roller member is formed of a different plastic material which is preferably relatively harder. Various different combinations of plastic materials can be used and fiberglass reinforcement can be advantageously employed in the plastic for the outer roller to reduce molding shrinkage and provide greater rigidity. For example, good results have been achieved with the outer roller member formed from polytetramethylene terephthalate plastic, sometimes identified as polyterephthalate of the glass reinforced type such as marketed by Eastman Chemical Products, Inc. of Kingsport, Tenn. under the trademark "Tenite"-Polyterephthalate 6G91. This material has a crystalline melting point of about 437°F. and can be injection molded at temperatures between 480° and 520°, and the polymer crystallizes rapidly at temperatures between 85° and 300°F. so that mold temperatures in this range may be used. This glass reinforced material has a relatively low molding shrinkage characteristic of the order of about 0.003 inches per inch.

The plastic material used for forming the inner stator member is selected to have a lower crystalline melting temperature, to allow molding at temperatures below the melting temperature of the roller, and a relatively higher molding shrinkage characteristic to provide sufficient clearance between the roller and stator when they are cooled to normal ambient temperature (about 75° F.) Preferably the plastic material used for the stator is also of a type having a low coefficient of friction. For example, the inner stator member can be formed of a polyacetal based oil lubricated plastic such as distributed by Cadillac Chemical Co. under the mark "OILON Pv 80." This is a polyacetal plastic having a relatively lower molding temperature and a relatively higher molding shrinkage characteristic than the polyterephthalate used for the outer roller. Thus, the Oilon Pv 80 has a molding shrinkage characteristic of the range of 0.024 to 0.032 inches per inch and provides adequate shrink clearance for a good running fit with the glass reinforced polyterephthalate roller described above, on even relatively small size roller assemblies in which the inner bearing surface has a diameter of only about three-eighths to seven-sixteenths inch. In addition, the plastic is highly lubricated with a petroleum based lubricant and has a relatively low coefficient to friction, for example, 0.05 to 0.10 against polished metal. Other plastic materials can be used for the roller and stator members provided they have the proper relative mold shrinkage characteristics to provide adequate clearance for a free running fit when the parts are cooled to normal ambient temperatures. For example, high density polyethylene may be used for the roller, with the polyethyene preferably glass reinforced to reduce shrinkage, and polypropylene used for the stator. Alternatively, nylon can be used for the roller and polypropylene or a polyacetal plastic for the stator. The molding shrinkage characteristics of plastic are average characteristics and the amount of shrinkage that will occur in different portions of the part being molded will vary with various factors including shape and thickness of the part, location of the sprue gates in the molds, etc. While satisfactory roller assemblies were made of the forms shown in FIGS. 5 and 6, some difficulties were encountered in obtaining uniformly consistent free running characteristics in the roller assemblies. Markedly improved consistency of results were achieved with the roller assembly shown in FIGS. 1–4 molded in the manner shown in FIGS. 7–10. It is considered that the confining of the injection molding of the inner stator member to circumferentially spaced locations on the outer roller member improves the overall roller assembly since it reduces the area of the inner roller member exposed to the relatively high molding pressures 12 –0 1,600 p.s.i.), and hence reduces distortion of the outer roller member during injection molding of the inner stator member. In addition, it is considered that the mold projections which formed a non-circular configuration of the inner stator member achieved better control of the shrinkage of the inner stator member. Moreover, the final roller assembly with the non-circular inner stator member has a reduced contact area between the inner and outer members, which is considered to aid in reducing the overall friction therebetween, the generally triangular or three legged configuration being preferred because of its self-centering action which can better accommodate any out of round characteristic in the outer roller member.

The embodiments of the invention in which an exclusive property or privilege is claimed are defined as follows:

1. A method of making a roller assembly including an inner stator member and an outer roller member rotatably and axially non-slidably supported on the stator member comprising: molding an outer roller member of a first plastic material in an annular shape having a circular outer rim surface; end faces, and a circular inner bearing surface having a minimum internal diameter intermediate said end faces and a relatively larger diameter adjacent said end faces, sealingly engaging end faces of the outer roller member between mold members shaped to form an enclosed mold cavity inside the annular roller member with at least circumferentially spaced portions of the inner bearing surface being wall portions of the mold cavity, injecting a heat melted charge of a second plastic into said mold cavity to fill the same, and cooling the charge of the second plastic to a solid state before removing the mold members to provide a rigid stator member having at least portions of its outer periphery shaped in conformity with the inner bearing surface on the roller member, said second plastic material having molding shrinkage characteristics to provide sufficient clearance for a running fit between said portions of the stator member and said inner bearing surface on the outer roller member.

2. A method of making a roller assembly according to claim 1 wherein said second plastic material has higher molding shrinkage characteristics than said first plastic material.

3. A method of making a roller assembly according to claim 1 wherein said first plastic material is reinforced with glass fibers and has a lower molding shrinkage characteristic than said second plastic material.

4. A method of making a roller assembly according to claim 1 wherein said second plastic material has a melt temperature substantially below the melt temperature of said first plastic material and said second plastic material has mold shrinkage characteristics higher than said first plastic material.

5. A method of making a roller assembly including an inner stator member and an outer roller member rotatably supported on the stator member comprising, molding a rigid outer roller member of a first plastic material in an annular shape having a circular inner bearing surface, sealingly engaging mold members with the end faces of the outer roller member and with only circumferentially spaced portions of the inner bearing surface to form a non-circular mold cavity in the annular roller member in which other portions of the inner bearing surface intermediate said circumferentially spaced portions provide wall portions of the mold cavity, injecting a heat melted charge of a second plastic material into the mold cavity to fill the same, cooling the charge of the second plastic material sufficient to solidify the charge before removing the mold members to provide a rigid non-circular stator member having circumferentially spaced portions shaped in conformity with said inner bearing surface, said second plastic material having mold shrink characteristics to provide a sufficient clearance for a running fit between said circumferentially spaced portions on the stator member and said inner bearing surface on the outer roller member.

6. A method of making a roller assembly according to claim 5 wherein non-circular mold cavity has a triangular configuration.

7. A method of making a roller assembly according to claim 5 in which said second plastic material has molding shrinkage characteristics higher than said first plastic material.

8. A method of making a roller assembly according to claim 5 wherein said second plastic material has a higher molding shrinkage characteristic and a lower melting temperature than said first plastic material.

9. A method of making a roller assembly according to claim 8 wherein said second plastic material has a lower coefficient of friction than said first plastic material.

10. A method of making a roller assembly according to claim 5 wherein said circular inner bearing surface is formed with an axially varying diameter.

11. A method of making a roller assembly according to claim 5 wherein said inner bearing surface of said outer roller member is formed with a longitudinally varying diameter relatively larger adjacent said end walls than at a location intermediate said end walls and said circumferentially spaced portions on the hub member conform to said longitudinally varying diameter.

12. A roller assembly comprising: a rigid outer roller member formed of a first plastic material having a circular outer rim surface; end faces, and a circular inner bearing surface of longitudinally varying diameter extending between said end faces coaxial with said outer rim surface, an inner stator member injection molded of a second plastic material in said inner bearing surface to have at least circumferentially spaced portions of its outer periphery shaped to conform with the longitudinally varying diameter of the inner bearing surface on the outer roller member, and said second plastic material having a molding shrinkage characteristic sufficiently high to provide clearance for a free running fit with said roller member when said stator member is cool.

13. A roller assembly according to claim 12 wherein the diameter of said inner bearing surface is a maximum adjacent said end faces and a minimum at a location spaced inwardly from said end faces of the outer roller member.

14. A roller assembly comprising: a rigid outer roller member formed of a first plastic material having a circular outer rim surface; end faces, and a circular inner bearing surface of axially varying diameter extending between said end faces coaxial with said outer rim surface, and an inner stator member injection molded of a second plastic material in said inner bearing surface to have circumferentially spaced portions of its outer periphery shaped to conform with the longitudinally varying diameter of the inner bearing surface on the outer rim member and have a close running fit therewith, the peripheral portions of said stator member intermediate said circumferentially spaced portions being spaced radially inwardly from said circumferentially spaced portions and out of running engagement with said inner bearing surface.

15. A roller assembly according to claim 14 wherein said inner stator member has a generally triangular configuration providing three of said circumferentially spaced portions on its outer periphery.

16. A roller assembly comprising: a rigid outer roller member formed of a first plastic material having a circular outer rim surface; end faces, and a circular inner bearing surface of longitudinally convex configuration, and an inner stator member formed by a second plastic material injection molded in said outer roller member and having at least circumferentially spaced portions of the stator member shaped by contact with the inner bearing surface and having a shrink clearance therewith.

* * * * *